April 13, 1965    E. H. AYERS    3,177,992
CLUTCH CONTROL SYSTEM
Filed Dec. 27, 1961    2 Sheets-Sheet 1

INVENTOR
EDGAR H. AYERS
BY
J. E. Wiessler
ATTORNEY

April 13, 1965 E. H. AYERS 3,177,992
CLUTCH CONTROL SYSTEM
Filed Dec. 27, 1961 2 Sheets-Sheet 2

INVENTOR
EDGAR H. AYERS
BY
J. C. Wiessler
ATTORNEY

United States Patent Office 3,177,992
Patented Apr. 13, 1965

3,177,992
CLUTCH CONTROL SYSTEM
Edgar H. Ayers, Battle Creek, Mich., assignor to Clark Equipment Company, a corporation of Michigan
Filed Dec. 27, 1961, Ser. No. 162,424
10 Claims. (Cl. 192—.096)

This invention relates to clutch control systems, and more specifically to a system for preventing engagement of a clutch if the engine to which the clutch is connected is conditioned to run above a predetermined speed.

Industrial vehicles, such as fork lift trucks, are generally ruggedly built to withstand hard usage. So long as they are properly operated they normally give satisfactory service with minimum maintenance and repairs. However, operator abuse of industrial trucks is a common problem in industry.

One of the more common problems in the area of operator abuse is engagement of the clutch while the truck engine is running substantially above idle speed, thus causing excessive slippage in the clutch and excessive shock loads on various parts of the power train. This is caused when the operator, for example, "races" the engine and then engages the clutch in order to achieve a rapid start, or shifts from forward to reverse drive while simultaneously disengaging and then re-engaging the clutch without releasing the accelerator pedal. Such abusive operation substantially shortens clutch life and may also cause failures in other parts of the power train, such as a drive shaft failure or the breaking of teeth in gears of the transmission.

A principal object of my invention is to provide a clutch control system which positively prevents the operator from engaging the clutch if the engine is conditioned to run above a predetermined speed.

Another object of my invention is to provide a clutch control system responsive to clutch and accelerator pedal position.

A further object of my invention is to provide a clutch control system interlocked with a means for varying the engine speed and operable so that the clutch cannot be engaged if the engine is conditioned to run above idle speed.

In carrying out my invention in one embodiment I provide a solenoid for actuating a clutch control valve. The solenoid is energizable by means of a power relay having a control circuit including a solenoid and a clutch pedal actuated switch which closes when the clutch pedal is depressed. Connected in parallel with said switch is a solenoid actuated hold-in switch which includes means for delaying its opening. The last-mentioned solenoid and an accelerator pedal actuated switch are connected in series with each other and in parallel with the power relay solenoid. Another embodiment of my invention is similar to that characterized above, except that the power relay solenoid is omitted.

The above and other objects, features and advantages of my invention will become more readily apparent to persons skilled in the art from the following detailed description when taken in conjunction with the drawing wherein.

Figure 1:
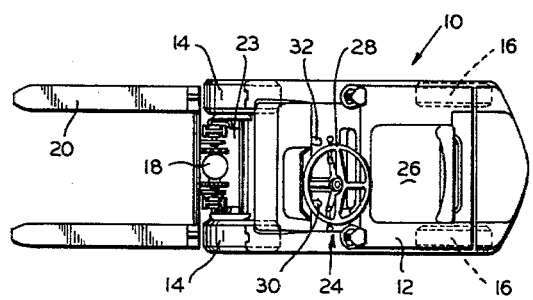
FIGURE 1 is a plan view of a fork lift truck embodying my invention.

Referring now to FIG. 1, a fork lift truck is shown at numeral 10. Lift truck 10 has a body portion 12 which is supported at the forward end thereof by a pair of drive wheels 14 and at the rearward end thereof by a pair of dirigible wheels 16. At the forward end of the body portion 12 there is mounted a lift upright 18 which carries a forwardly extending fork 20 for engaging and transporting loads in a well-known manner. Enclosed within body portion 12 is a power train, a portion of which is shown at numeral 22 in FIG. 2, which serves to power drive wheels 14 through a drive axle 23. Lift truck 10 also includes an operator's station generally indicated by reference numeral 24 having a seat 26, a steering control wheel 28 located forwardly of seat 26, a clutch pedal 30 for controlling clutch engagement and disengagement and located on the floor of the operator's station 24 for operation by the operator's left foot, an accelerator pedal 32 for varying engine speed and also located on the floor of the operator's station 24 for operation by the operator's right foot, and various other conveniently located controls for operating the lift upright 18 and the like.

Figure 2:
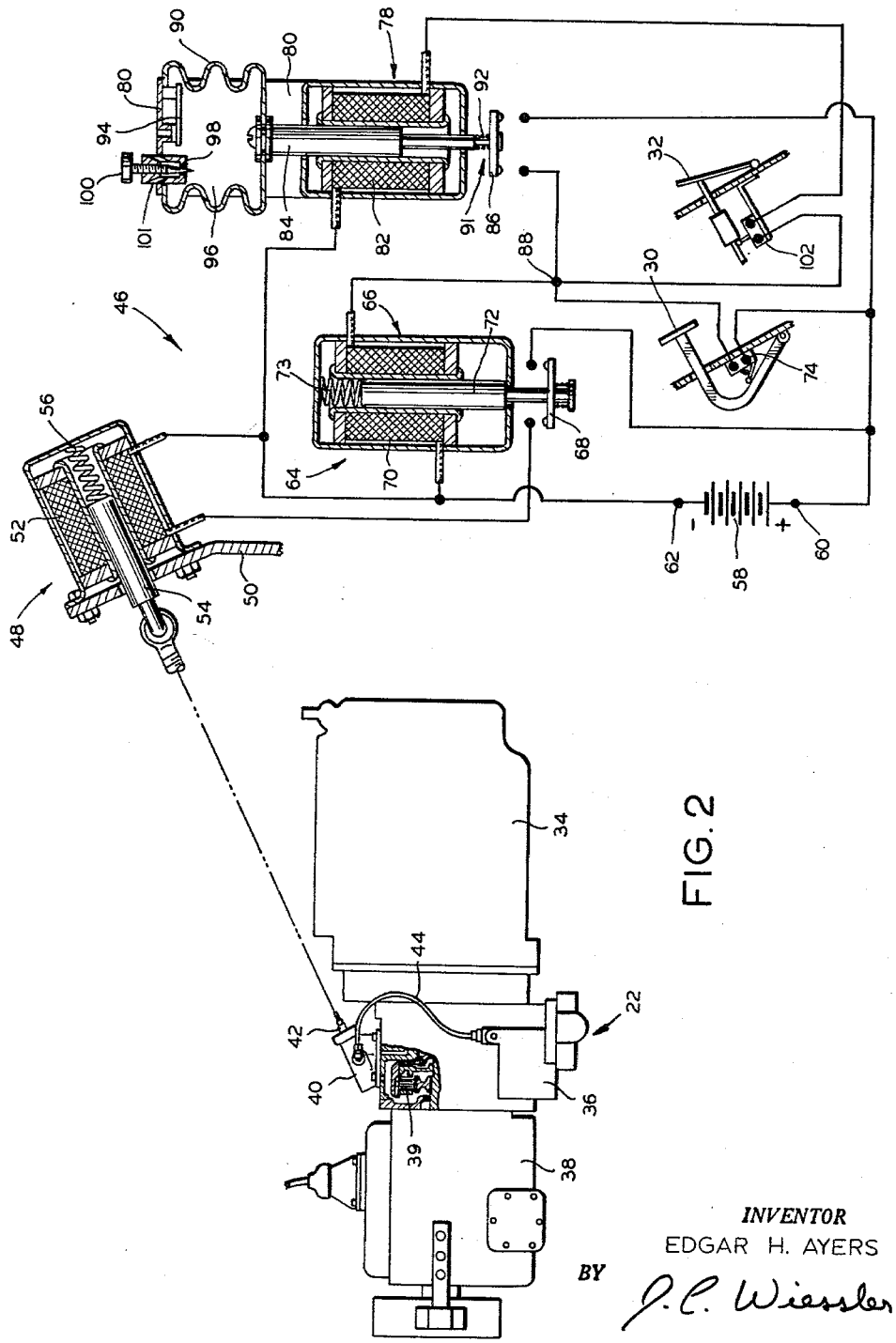
FIGURE 2 shows somewhat diagrammatically one embodiment of my invention in conjunction with a portion of the power train utilized with the lift truck shown in FIG. 1.

Referring now to FIG. 2, the power train portion 22 includes an engine 34, a hydrodynamic torque converter 36 connected to engine 34, a gear transmission 38 connected to drive wheels 14, and a clutch 39 disposed in the hydrodynamic torque converter casing and operable to connect and disconnect engine 34 to drive wheels 14 through the clutch and transmission. Mounted on the torque converter casing is a clutch control valve 40 having a coaxially slidable spool member 42 which directs control pressure fluid from line 44 to clutch 39 with spool 42 in one position and blocks communication of such fluid between line 44 and the clutch with spool 42 in the other position thereof. The above general description of the torque converter, clutch and gear transmission is believed to be sufficient for present purposes. A more detailed description of this portion of the power train may be found in U.S. Patent No. 2,935,169, issued on May 3, 1960, in the name of Burton L. Mills.

Actuation of spool member 42 to the position wherein control fluid communicates with clutch 39 causes the clutch to be engaged, and actuation to the position wherein such communication is blocked causes the clutch to disengage. A clutch control system 46 controls the position of spool member 42. A valve control solenoid 48 of control system 46 is secured adjacent control valve 40 to power train 22 by means of a bracket 50. Solenoid 48 includes a plunger 54 slidably disposed within a coil 52. The plunger 54 is biased outwardly of the solenoid, as shown, by means of a helical spring 56, and is actuated inwardly thereof when the solenoid is energized. Clutch control 46 includes a power source, such as battery 58, having positive and negative terminals 60 and 62, and a power relay 64 having a solenoid 66 and a switch 68. The solenoid 66 includes a plunger 72 slidably disposed in a coil 70 and connected at the outer end to switch 68. The plunger 72 is urged outwardly to a switch opening position by means of a helical spring 73 and inwardly to a switch closing position when coil 70 is energized. The switch 68 and coil 52 are connected in series between positive terminal 60 and negative terminal 62 so that when switch 68 is closed coil 52 will be energized, thus causing plunger 54 to move inwardly and actuate spool member 42 to disengage the clutch. A normally open switch 74, which is actuated closed when clutch pedal 30 is depressed is connected in series with coil 70 and terminals 60 and 62, and in parallel with switch 68 and coil 52. It will be apparent from the foregoing that depression of clutch pedal 30 will cause switch 74 to close, thereby energizing coil 70 which closes switch 68, energizing in turn coil 52 with the result that clutch control valve 40 is actuated to disengage the clutch. It will also be noted that the current drawn by coil 52 is separate from the current passing through switch 74 and coil 70. The foregoing described portion of clutch control system 46 may be denoted the power relay and clutch control circuit.

The clutch control system 46 further includes a hold-in switch 86 actuated by a solenoid 78 mounted on a frame portion 80. The solenoid 78 includes a coil 82 and a plunger 84 slidably disposed therein. One end of plunger 84 is secured to switch 86 which is connected in parallel with switch 74, having a common connection 88 therewith. The other end of plunger 84 is secured to one end of a flexible metallic bellows 90 which is secured at its other end to frame portion 80 so that coil 82 and the said other end of bellows 90 are maintained in fixed spaced relation. Bellows 90 normally maintains plunger 84 in the open switch position shown; energization of coil 82 causes plunger 84 to move downwardly and close switch 86. It is to be noted that switch 86 is secured to plunger 84 by means of a lost motion connection 91, including spring 92, so that after switch 86 is closed plunger 84 is still permitted limited additional downward movement for reasons to be explained below. The bellows 90 has a one-way valve 94 for allowing an unrestricted flow of air to enter chamber 96 of the bellows during downward movement of plunger 84. While a leaf spring type one-way valve is shown at 94, it will be appreciated that many other types of one-way valves would be equally suitable. The bellows also contains an adjustable orifice 98 having a needle valve 100 for permitting a restricted adjustable flow of air into and from chamber 96 through openings 101. The flow of air into chamber 96 through orifice 98, however, is not of any consequence. Downward movement of plunger 84 therefore causes air to be pulled into chamber 96 mainly by way of one-way valve 94; the escape of such air from the bellows is restricted by orifice 98 so that upward movement of plunger 84 following de-energization of coil 82 is retarded. A normally open switch 102 is mounted adjacent accelerator pedal 32 so that depression of accelerator pedal 32 causes switch 102 to close. Switch 102 and coil 82 are connected in series with battery terminals 60 and 62.

Turning now to the operation of my invention, it was pointed out previously that depression of clutch pedal 30 closes switch 74 which causes switch 68 to close, thus energizing coil 52 and actuating spool member 42 to a clutch disengaging position. Depression alone of accelerator pedal 32 to close switch 102 has no effect inasmuch as no circuits are completed by such action. However, if both switches 74 and 102 are closed coil 82 is energized which causes switch 86 to close. In this condition coil 70 will remain energized even though switch 74 is opened and for so long as switch 102 is maintained closed inasmuch as switch 86 is in series with coil 70 and switches 86 and 102 are in series with coil 82. Because of the retarded openng movement of plunger 84 and the action of lost motion connection 91, the switch 86 is held closed for a predetermined interval following de-energization of coil 82 so that the clutch is maintained in its disengaged condition for said predetermined interval following the opening of switch 102. The rate of spring 92 and the adjustment of needle valve 100 in orifice 98 are such that said predetermined interval permits the engine speed to decrease so that the clutch cannot be engaged while an excessive difference in rotational speed between the various clutch parts exists.

The embodiment of my invention described above is used in a low voltage system in which solenoid 48 draws a relatively large current. By using power relay 64 the switches 74, 102 and 86 need not carry the heavy current required by solenoid 48, and therefore can be made lighter and smaller, and so more easily actuated.

Figure 3:
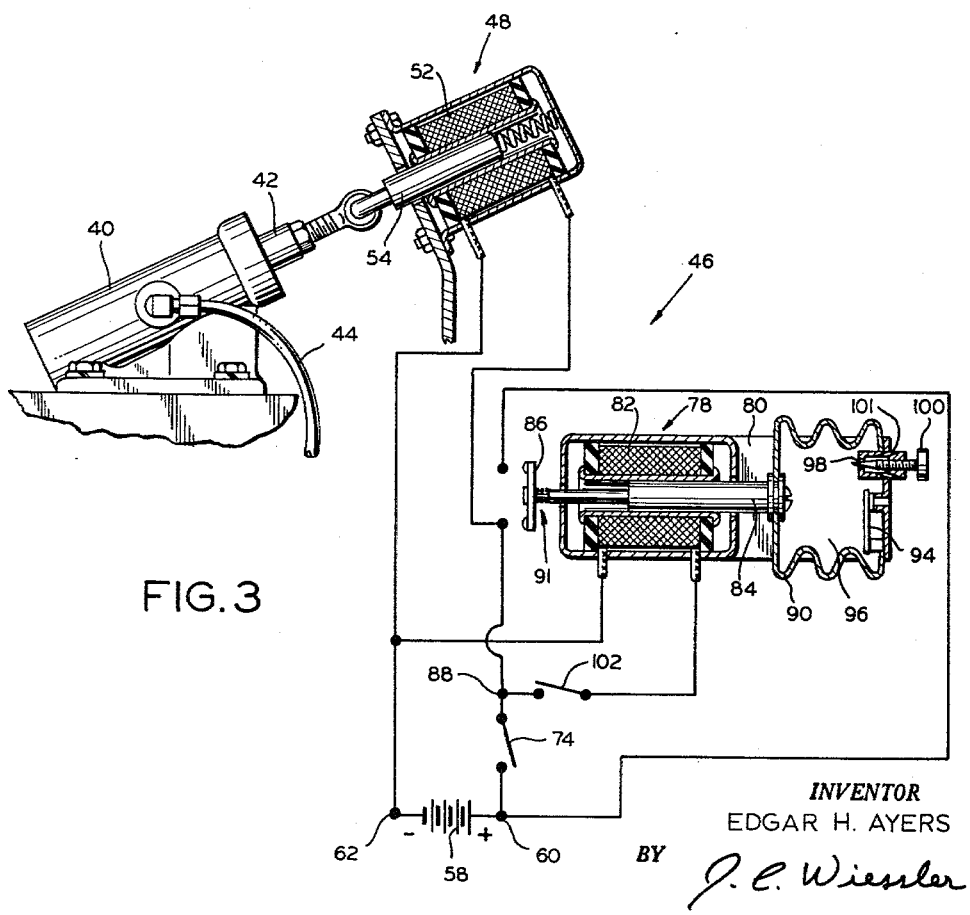
FIGURE 3 is a view similar to FIG. 2 showing a modification of my invention.

In a higher voltage system the embodiment shown in FIG. 3 is preferred because the coil 52 will draw a smaller current which can be readily handled by switches 74, 86 and 102. This embodiment is essentially the same as that shown in FIG. 2 except that the power relay circuit for operating switch 68 has been omitted. As a result switch 74 is connected directly in series with coil 52.

In FIG. 3 switches 74 and 102 are shown diagrammatically although it will be understood that they are intended to be associated with clutch pedal 30 and accelerator pedal 32 the same as shown in FIG. 2.

While I have shown and described only two physical embodiments of my invention, numerous changes, modifications and rearrangements of parts within the spirit and scope thereof will become apparent to persons skilled in the art. For example, the mode of operation can be readily reversed so that the clutch control system has no current flow when the clutch is disengaged and full current flow to engage the clutch. It will also be apparent that equivalent hydraulic or mechanical components can be readily substituted for the electrical components described herein without departing from the scope of the invention as defined in the claims appended.

I claim:

1. In a vehicle having an engine, means for varying the engine speed, drive wheels and a clutch for connecting and disconnecting the engine and drive wheels, a clutch control system comprising means for engaging and disengaging the clutch including a clutch pedal and a first solenoid operable when energized to disengage the clutch, a pair of connections to a source of power, a circuit including a first normally open switch and said first solenoid connected in series between one said connection and the other said connection, said first switch closing when said clutch pedal is depressed, a second normally open switch connected in parallel with said first switch, a second solenoid and a third switch connected in series between said pair of connections, said second solenoid being operable when energized to close said second switch, said third switch opening and closing in response to actuation of the speed varying means, closure of said third switch occurring when said varying means conditions the engine to run above a predetermined engine speed, and means operatively connected to said second switch for delaying the opening of said second switch following the opening of said third switch.

2. In an industrial truck having an engine, means for varying the engine speed, drive wheels and a clutch for connecting and disconnecting the engine and drive wheels, a clutch control system comprising means for engaging and disengaging the clutch, a pair of connections to a source of power, a power circuit including first power circuit control means and said clutch engaging means connected in series between said connections, second power circuit control means having an open position and a closed position and connected in parallel with said first power circuit control means, said first and second power circuit control means having a common connection, means for actuating said second power circuit control means between said open and closed positions, and third power circuit control means connected in series between said common connection and said other connection, said third power circuit control means opening and closing in response to actuation of the means for varying engine speed, and means for delaying the actuation of said second power circuit control means from one of said positions to the other of said positions.

3. In a vehicle having a variable speed engine and means for propelling the vehicle, a clutch for connecting and disconnecting the engine and propelling means, means for engaging and disengaging said clutch including a first solenoid operable when energized to disengage said clutch, a pair of connections to a source of power, a circuit including a first switch and said first solenoid connected in series between one said connection and the other said connection, a second switch connected in parallel with said first switch, said first and second switches having a common connection, a second solenoid and a third normally open switch connected in series between said common connection and the said other connection, said second solenoid being operable when energized to close said second switch, said third switch being closed when the engine is conditioned to run above a predetermined limit, and means for delaying the opening of said second switch.

4. In a vehicle having an engine and ground engaging support means, means for varying the engine speed, a clutch for connecting and disconnecting the engine and the support means, means for engaging and disengaging said clutch including a first solenoid, a pair of connections to a source of power, a circuit including a first switch and said first solenoid connected in series between one said connection and the other said connection, a second switch having an open and a closed position and connected in parallel with said first switch, said first and second switches having a common connection, a second solenoid and a third switch connected in series between said common connection and said other connection, said second solenoid being operatively connected to said second switch and operable to actuate said second switch between said open and closed positions, said third switch being actuatable between an open and closed position and responsive to the actuation of said engine speed varying means, and means for delaying the actuation of said second switch to one of said positions.

5. A clutch control system comprising, in combination a vehicle having an engine, means for varying the engine speed, ground engaging driving means and a clutch for connecting and disconnecting said engine and said driving means, means for engaging and disengaging said clutch including a control valve and a first solenoid connected to said control valve, a pair of connections to a source of power, a circuit including a first switch and said first solenoid connected in series between one said connection and the other said connection, a second switch connected in parallel with said first switch, said first and second switches having a common connection, a second solenoid and a third switch connected in series between said common connection and said other connection, said second solenoid being operable to open and close said second switch, said third switch opening and closing in response to actuation of the engine speed varying means, and means for delaying actuation of said second switch from one position to the other position.

6. In a vehicle having an engine, means for varying the engine speed, drive wheels and a clutch for connecting and disconnecting the engine and drive wheels, a clutch control system comprising means for engaging and disengaging the clutch including a control valve and a first solenoid connected to said control valve, a pair of connections to a source of power, a first circuit including a first switch and said first solenoid connected in series between one said connection and the other said connection, a second circuit connected in parallel with said first circuit and including a second switch and a second solenoid connected in series, said second solenoid being operable to open and close said first switch, a third switch connected in parallel with said second switch, said second and third switches having a common connection, a fourth switch and a third solenoid connected in series between said common connection and said other connection, said third solenoid being operable to open and close said third switch, said fourth switch opening and closing in response to actuation of the engine speed varying means, and means for delaying actuation of said third switch from one condition to the other condition.

7. In a vehicle having an engine, means for varying the engine speed, drive wheels and a clutch for connecting and disconnecting the engine and drive wheels, a clutch control system comprising means for engaging and disengaging the clutch including a clutch pedal, control valve and a first solenoid operable when energized to disengage the clutch, said first solenoid being connected to said control valve, a pair of connections to a source of power, a circuit including a first normally open switch and said first solenoid connected in series between one said connection and the other said connection, said first switch closing when said clutch pedal is depressed, a second normally open switch connected in parallel with said first switch, said first and second switches having a common connection, a second solenoid and a third switch connected in series between said common connection and said other connection, said second solenoid being operable when energized to close said second switch, said third switch opening and closing in response to actuation of the means for varying engine speed, actuation of the means for varying engine speed to cause an increase in engine speed causing said third switch to close, and means operatively connected to said second switch for delaying the opening of said second switch following the opening of said third switch.

8. In a vehicle having an engine, means for varying the engine speed, drive wheels and a clutch for connecting and disconnecting the engine and drive wheels, a clutch control system comprising means for engaging and disengaging the clutch including a clutch pedal, a control valve and a first solenoid connected to said control valve and operable when energized to disengage the clutch, a pair of connections to a source of power, a first circuit including a first normally open switch and said first solenoid connected in series between one said connection and the other said connection, a second circuit connected in parallel with said first circuit and including a second normally open switch and a second solenoid connected in series, said second switch closing when said clutch pedal is depressed, said second solenoid being operable to open and close said first switch, a third switch connected in parallel with said second switch, said second and third switches having a common connection, a fourth switch and a third solenoid connected in series between said common connection and said other connection, said third solenoid being operable to open and close said third switch, said fourth switch opening and closing in response to actuation of the engine speed varying means, operation of the engine speed varying means to condition the engine for an increase in engine speed causing said fourth switch to close, and means operatively connected to said third solenoid for delaying the opening of said third switch.

9. In a vehicle having a variable speed engine, ground engaging drive means for propelling said vehicle and a clutch for connecting and disconnecting said engine and ground engaging drive means, a clutch control system comprising means for engaging and disengaging the clutch including a control valve and a first solenoid connected to said control valve and operable when energized to disengage the clutch, a pair of connections to a source of power, a circuit including a first switch and said first solenoid connected in series between one said connection and the other said connection, a second switch connected in parallel with said first switch, said first and second switches having a common connection, a second solenoid and a third normally open switch connected in series between said common connection and the said other connection, said second solenoid being operable when energized to close said second switch, said third switch being closed when the engine is conditioned to run above a predetermined limit, and means for delaying the opening of said second switch.

10. In a vehicle having a variable speed engine, a ground engaging drive means and a clutch for connecting and disconnecting said engine and ground engaging drive means, a clutch control system comprising means for engaging and disengaging the clutch including a control valve and a first solenoid connected to said control valve, a pair of connections to a source of power, a first circuit including a first switch and said first solenoid connected in series between one said connection and the other said connection, a second circuit connected in parallel with said first circuit and including a second switch and a second solenoid connected in series, said second solenoid being operable to open and close said first switch, a third switch connected in parallel with said second switch, said second and third switches having a common connection, a fourth switch and a third solenoid connected in series between said common connection and said other connection, said third solenoid being operable to open and close said third switch, said fourth switch being closed when the engine is conditioned to run above a predetermined limit, and means for delaying the opening of said third switch.

References Cited by the Examiner

UNITED STATES PATENTS

| | | | |
|---|---|---|---|
| 1,143,686 | 6/15 | Carpenter | 192—.02 |
| 2,561,949 | 7/51 | Reese | 192—.096 |
| 2,702,615 | 2/55 | Morse | 192—.096 |
| 2,727,600 | 12/55 | Eickstaedt | 192—.096 |
| 2,771,168 | 11/56 | Panish | 192—.096 |

DAVID J. WILLIAMOWSKY, *Primary Examiner.*

THOMAS J. HICKEY, *Examiner.*